United States Patent [19]

Peters

[11] 4,204,467
[45] May 27, 1980

[54] DE-STONING AND SIMULTANEOUSLY FILLING A DRUPE

[76] Inventor: Lester G. Peters, Box 407, Newburyport, Mass. 01950

[21] Appl. No.: 931,136

[22] Filed: Aug. 4, 1978

[51] Int. Cl.² .......................... A23N 4/12; A47J 25/00
[52] U.S. Cl. ........................................ 99/494; 99/544; 99/557; 99/564; 426/281
[58] Field of Search ................. 99/494, 515, 542, 544, 99/547–549, 551, 557, 558, 564; 426/281, 282, 284, 138, 93, 102, 615, 485; 30/113.1–113.3

[56] References Cited

U.S. PATENT DOCUMENTS

| | | | |
|---|---|---|---|
| 1,206,659 | 11/1916 | Bethke | 99/515 |
| 1,231,286 | 6/1917 | Newcomb | 99/494 |
| 1,435,877 | 11/1922 | Reubold | 99/515 |
| 1,646,564 | 10/1927 | Vaughn | 30/113.2 |
| 2,118,976 | 5/1938 | Larkin | 99/494 |
| 2,351,788 | 6/1944 | Smith | 426/282 |
| 2,991,813 | 7/1961 | Wilms | 99/494 |
| 3,018,805 | 1/1962 | Puccinelli | 99/551 |
| 3,932,673 | 1/1976 | Webster | 426/282 |

Primary Examiner—Harvey C. Hornsby
Assistant Examiner—Timothy F. Simone
Attorney, Agent, or Firm—Lee A. Strimbeck

[57] ABSTRACT

A device for extracting the stone of a drupe and simultaneously injecting a filling into the stone cavity comprises a claw member comprised of three to four hollow prongs through which a flowable filling can be injected. The prongs are adapted to be jabbed into a drupe such as a peach, to be closed about the stone thereof to firmly grip it, and to extract or tear the stone from the drupe while a filling is being injected via the prongs into the drupe.

2 Claims, 3 Drawing Figures

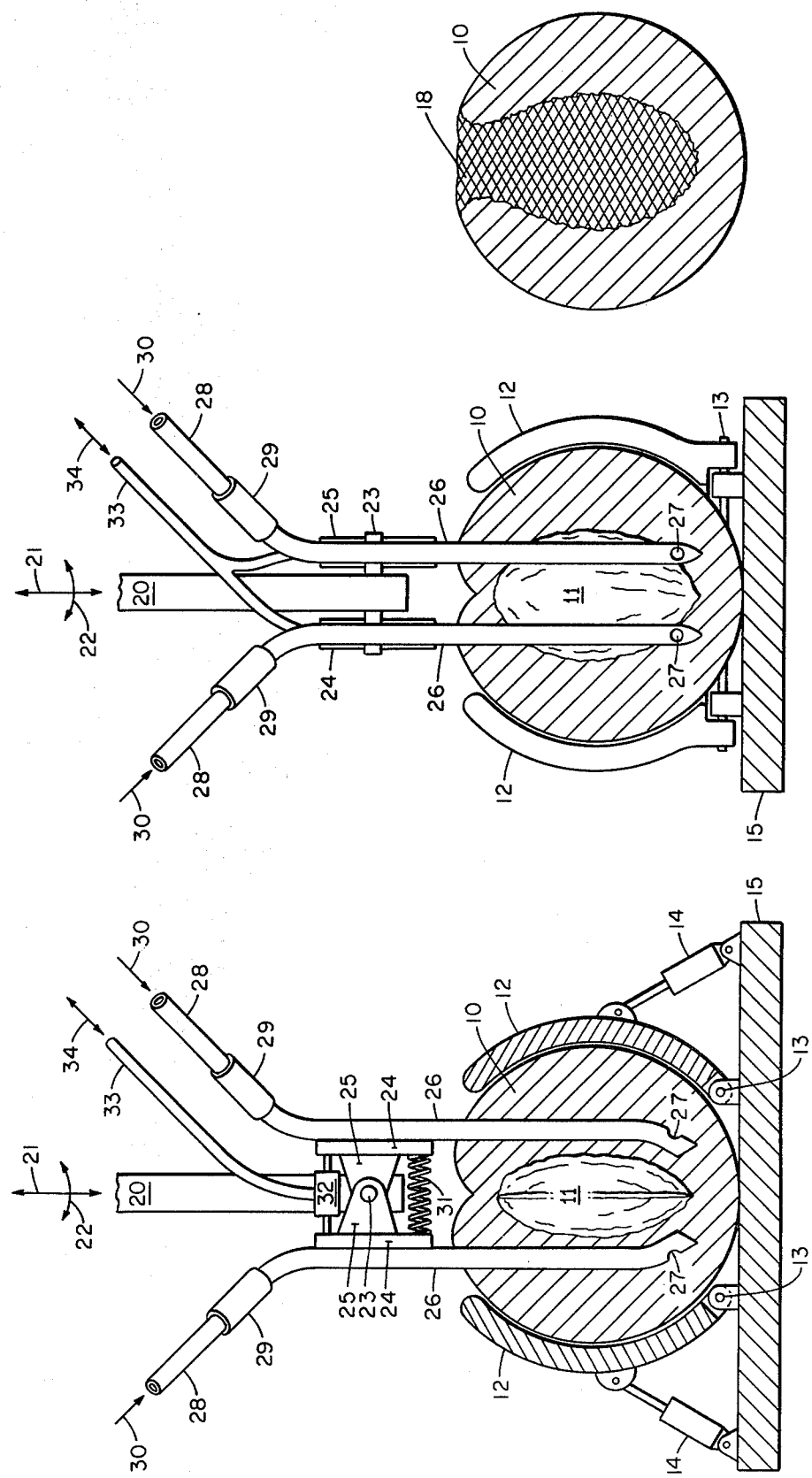

DE-STONING AND SIMULTANEOUSLY FILLING A DRUPE

INTRODUCTION

Various mechanical methods have been proposed for removing stones from fruits of the drupe family, such as peaches, cherries, plums and olives. See, for example, U.S. Pat. No. 1,653,552 and U.S. Pat. No. 2,403,518 and the present inventor's U.S. Pat. No. 3,987,948. Others have proposed methods for filling the de-stoned fruit, especially olives. However, until now, it has not been proposed to de-stone a drupe while simutaneously filling it with a tasty filling.

THIS INVENTION

This invention is concerned with an apparatus and method for removing the stone of single stone-containing fruits of the drupe family, especially the larger-sized ones such as peaches and apricots, while simultaneously injecting a tasty filling.

In brief compass, this invention is a device adapted to remove the stone from a drupe while simultaneously injecting a filling into the stone cavity. The device comprises a claw member having at least three prongs or "fingers" pivotedly mounted to the end of a shaft, with the shaft being adapted to plunge the prongs into a drupe, and when the prongs are closed to extract or tear the stone from the drupe. At least one of the prongs and preferably all of them have a passageway for injecting a flowable filling into the stone cavity as the stone is being lifted out of the cavity. The pressure of the in-flowing filling is some help in lifting the stone out of the cavity.

Preferably the prongs of the claw consist of four prongs of two sets of two each which are spring-biased as to be normally in an open position and are forced to close about the stone of the drupe when in position to extract it as by hydraulic means.

The fruit de-stoned in the manner of this invention and filled with a filling such as a custard or tart filling, when suitably packaged, is marketable as a dessert or snack item.

THE DRAWINGS

In the drawings:

FIG. 1 is front elevational view of the claw device of this invention in place in a peach prior to closing of the prongs and exraction of the stone. The peach and the supporting apparatus is shown in section at a plane just in front of the prongs with the stone, however, being shown in full detail.

FIG. 2 is a side elevational cross-sectional view of the same peach and apparatus in the same position with the section being taken again just in front of the prongs.

FIG. 3 is a cross-sectional view of the final product of the de-stoning and filling procedure.

DESCRIPTION

With reference to the drawings, item 10 is a peach having a stone 11 and supported on a holding and positioning device (not part of the invention) comprising wide, curved, spatula-like clamps hinged at the bottom thereof at 13 and caused to open and close as desired by small hydraulic cylinders 14.

The device of this invention comprises a square shaft 20 adapted for reciprocating motion and also preferably for slight rotation, as indicated by the directional arrows 21 and 22, respectively. Shaft 20 supports a pivot 23 which carries on either side of the shaft two sets of mounting plates 24, mounted by ears 25 on shaft 23 so as to be pivotable thereabout. Attached to plates 24 as by silver soldering or welding are four hollow prongs 26 which may be of, for example, stainless steel tubing and slightly curved at the end thereof as illustrated.

The ends of tubing 26 are preferably solid and shaped for penetration of the peach, i.e. they have a sharp point as shown. Behind this point is an opening at 27 into the interior of the tube to permit a filling to flow out from the tube into the stone cavity of the peach. The upper parts of tubing 26 are connected to flexible, e.g. plastic, feedlines 28 as by threaded collars 29. A flowable filling, such as a warm cream or gel, is introduced into lines 28 under slight pressure as indicated by directional arrows 30.

Two springs 31 (only one of which is visible) between the prongs of each set of prongs bias the prongs in a normally open position. Closing of the prongs is effected by a small hydraulic cylinder 32 mounted between and acting upon plates 24. A pressure fluid such as castor oil is supplied to the hydraulic cylinder by line 33. As indicated by directional arrows 30 pressure is applied to the hydraulic cylinder and released during the operating cycle as required in a known manner.

In operation a peach 10 which may have been pre-slit or cut above the stone is positioned in the holding device with the stone oriented to the prongs 26 and the fingers 12 of the holding device closed thereabout gently to hold it in place during the extraction step. Reciprocating arm 20 is then smartly lowered causing the ends of prongs 26 to penetrate the peach about the stone. While in the down position hydraulic cylinder 32 is then actuated by being pressurized from line 33, causing prongs 26 to pivot about pivot 25 and close on the stone 11 of the peach.

At this point it is preferred to slightly rotate arm 20 as indicated by directional arrows 22 15°–30° in either direction so that the prongs 26 may cut some of the flesh of the fruit about the stone and thus facilitate extraction of the stone. Depending upon the strength and size of the components, however, this slight wiggling or rotational motion may or may not be necessary.

Once the prongs 26 have been closed about the stone by means of hydraulic cylinder 32, arm 21 is raised pulling the stone from the peach. Just prior to or at the start of this pulling motion, a flowable filling is injected via lines 28, prongs 26 and openings 27 into the stone cavity under slight pressure. Thus as shaft 20 raises and with proper coordination of the amount being injected the stone cavity is smoothly filled with filling as the stone is extracted therefrom which tends to eliminate any holding vacuum on the stone with the filling lifting or floating the stone out of the cavity.

When the stone and prongs 26 are lifted completely free of the peach 10, the positioning device carried on platform 15 is moved to the next station, e.g. packaging, and the hydraulic cylinder 32 is deactivated, allowing spring 31 to open the prongs and drop the stone in preparation for the next cycle.

The filled peach of this invention is illustrated in FIG. 3. It consists essentially of the original flesh of the fruit 10 containing a suitable filling 18 in the stone cavity. Prior to the de-stoning operation the peach will have had its skin removed as by dipping in hot water, but if this has not been done prior to the de-stoning and filling step, it can now be done at this stage.

Filling 18 can be any suitable custard, jelly or the like filling. A suitable, flowable peppery filling is set out in the following recipe:

Plain Cream Filling
½ pint milk
½ pint heavy cream
¾ cup brown sugar
¾ cup flour
½ teaspoon butter
2 eggs
vanilla extract Blend first six ingredients and bring to boil stirring constantly until thickened. Let cool. Add vanilla to taste.

Peppery Filling
1 green tomato
⅓ cup raisins
¾ teaspoon white pepper (or ½ teaspoon black or cayenne pepper)

Put raisins and tomato through grinder, chop fine. Simmer until well cooked in tightly covered pan. Strain and add pepper to juice and blend well. Then add to Plain Cream Filling, blending well.

The above Peppery Filling provides a filled peach dessert with a tangy, memorable and stimulating taste.

What is claimed is:

1. A device adapted to remove the stone of a drupe while simultaneously injecting a filling into the stone cavity, comprising:

(a) a claw member comprising a shaft and at least three prongs pivotedly mounted to an end of said shaft, said prongs having an open position and a closed position;

(b) said prongs being shaped for the penetration of said drupe and being positioned in the open position to fit about the stone of said drupe and in the closed position to grip said stone for extraction;

(c) at least one of said prongs having a passageway permitting the passage of a flowable filling therethrough, one end of said passageway opening near the end of said one prong that enters into said cavity to the bottom portion thereof when said prongs are in a position to effect extraction of said stone, and the other end of said passageway being adapted to receive a pressurized supply of said flowable filling;

(d) means for positioning said drupe adjacent said claw member with said stone oriented for gripping by said prongs;

(e) means for effecting a linear reciprocating motion of said claw member to and from said drupe with entry of said prongs into said drupe about the stone thereof on the stroke to said drupe and extraction of said stone on the stroke from said drupe;

(f) means for effecting pivotal movement of said prongs from said open to said closed position during extraction of said stone and back to said open position when said prongs are removed from said drupe;

(g) means for injecting a pre-determined amount of said filling through said one prong during the extraction of said stone.

2. The device of claim 1 wherein said claw member comprises four prongs, two sets of two prongs each, each set of prongs being spring-biased to the open position.

* * * * *